United States Patent
Sabel

(10) Patent No.: US 8,678,833 B2
(45) Date of Patent: Mar. 25, 2014

(54) METHOD AND DEVICE FOR TRAINING OF A USER

(75) Inventor: Bernhard A. Sabel, Berlin (DE)

(73) Assignee: Bernhard A. Sabel, Berlin (DE)

( * ) Notice: Subject to any disclaimer, the term of this patent is extended or adjusted under 35 U.S.C. 154(b) by 990 days.

(21) Appl. No.: 11/989,044

(22) PCT Filed: Jul. 18, 2006

(86) PCT No.: PCT/EP2006/064370
§ 371 (c)(1),
(2), (4) Date: Dec. 2, 2009

(87) PCT Pub. No.: WO2007/009990
PCT Pub. Date: Jan. 25, 2007

(65) Prior Publication Data
US 2010/0068684 A1   Mar. 18, 2010

Related U.S. Application Data

(60) Provisional application No. 60/700,077, filed on Jul. 18, 2005.

(51) Int. Cl.
*G09B 3/00*   (2006.01)

(52) U.S. Cl.
USPC .................. 434/322; 434/323; 434/350

(58) Field of Classification Search
USPC ......................... 434/322, 323, 350
See application file for complete search history.

(56) References Cited

U.S. PATENT DOCUMENTS

| | | |
|---|---|---|
| 4,611,996 A | 9/1986 | Stoner |
| 6,120,300 A | 9/2000 | Ho et al. |
| 2002/0082915 A1* | 6/2002 | Reiffel et al. ................. 705/14 |
| 2004/0073488 A1 | 4/2004 | Etuk et al. |
| 2004/0191747 A1* | 9/2004 | Atsumori et al. ............ 434/323 |
| 2005/0003894 A1 | 1/2005 | Piccionelli et al. |
| 2005/0130112 A1* | 6/2005 | Lotvin et al. ................. 434/323 |
| 2008/0270240 A1* | 10/2008 | Chu ................................ 705/14 |

FOREIGN PATENT DOCUMENTS

| | | |
|---|---|---|
| JP | 10511472 A | 11/1998 |
| JP | 2004184783 A | 7/2004 |
| JP | 2004283285 A | 10/2004 |
| WO | WO 03/005328 | 1/2003 |

* cited by examiner

*Primary Examiner* — Robert J Utama
(74) *Attorney, Agent, or Firm* — Clark & Elbing LLP

(57) ABSTRACT

A training device for training at least one user comprising a user output interface (3) for presenting at least one training task (t) to said user (2), a user input interface (4) for inputting a response of said user (2) to each presented training task (t), means (5) for detecting a performance (p) of said user (2) on the basis of the responses input by said user (2), and means (6) for presenting rewards for the detected performance (p) of said user, wherein said rewards are selected depending on a training date (TD) on which the responses are input by said user (2) and depending on an age (A) of said user (2).

34 Claims, 9 Drawing Sheets

FIG 1
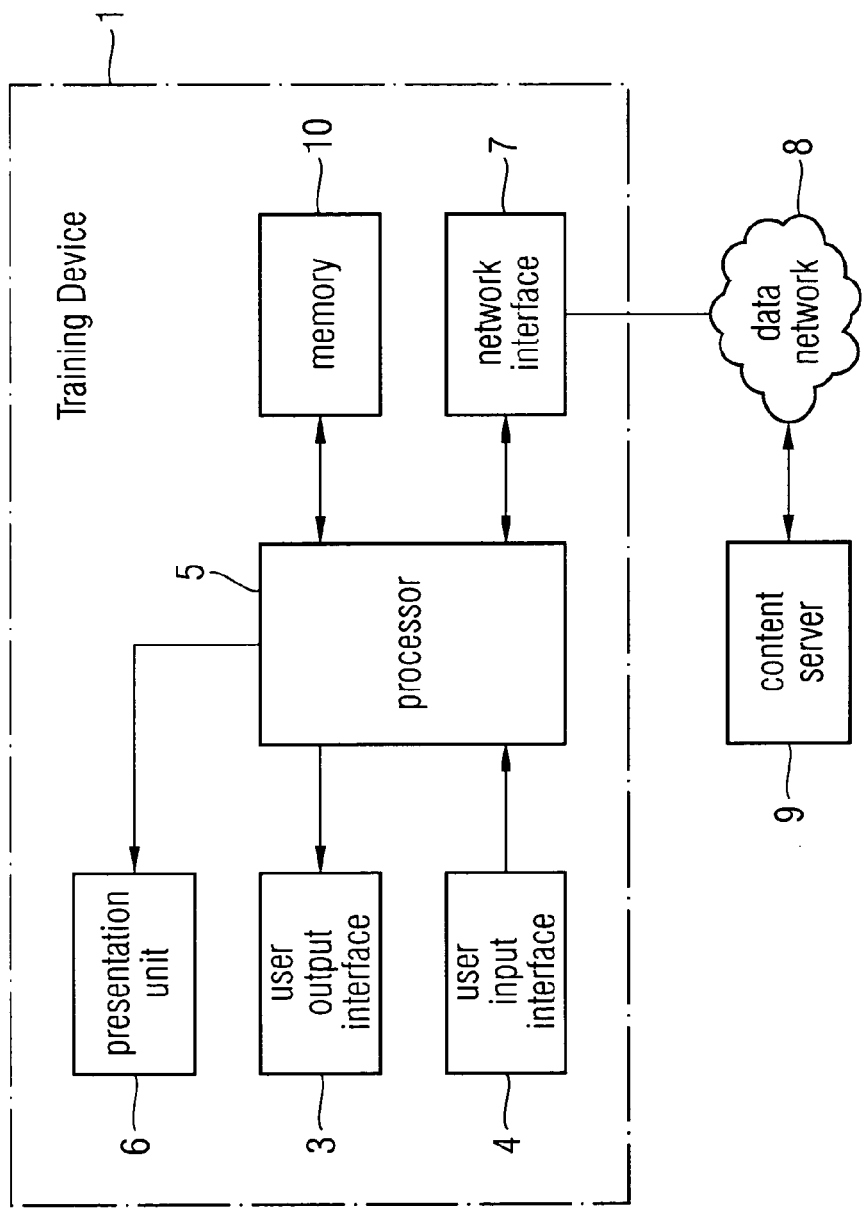
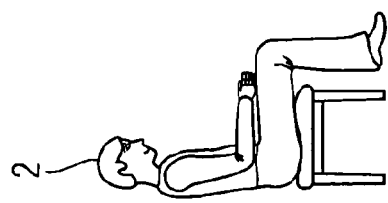

cutting of a media file into parts

METHOD AND DEVICE FOR TRAINING OF A USER

CROSS REFERENCE TO RELATED APPLICATIONS

This application is the U.S. National Stage of International Application No. PCT/EP2006/064370, filed Jul. 18, 2006, which claims benefit of U.S. Provisional Application No. 60/700,077, filed Jul. 18, 2005, each of which is hereby incorporated by reference.

The invention relates to a device and a method for training a user.

Physical and mental training of users, in particular, of older users having an age-related diminished mental capacity becomes more important since the portion of old people increases in our society. Muscle training and sports improve the physical performance whereas mental training and psychological exercises are used to improve mental functions of the mind. Mental exercises are carried out to either learn a new task, improve normal functions to achieve above average performance levels or to relearn tasks previously known but lost due to disability, such as brain degeneration.

There are conventional mental training programs aimed at improving functions of the human brain, such as described by Carson et al., Nature Medicine 4, 1083 (1998) and Merzenich et al. in Science 271, 77 (1996). Because such a training helps users to improve their performance level, for instance in the language domain or in visual performance, the patients will feel that they get better over time which in itself may be sufficient motivation to perform the mental exercise.

However, often the performance improvements alone are not sufficient because the user is either not interested to achieve improvements, i. e. the user lacks intrinsic interest, or either the improvements are so small that they are not readily noticed by the user. Therefore, it is desirable to combine a physical and mental training task presented to the user with a reward tool that keeps the user engaged in the presented training task.

Most known computer games are not designed to improve mental functions but are primarily used for entertainment. Most computer games are designed for young and adult persons. In many computer games, rewards are given to the player when he reaches certain goals. In some games, the player can collect points when he fulfils a presented task. Sometimes, computer games are also given itself as a reward in a training method. For example, in U.S. Pat. No. 6,629,844, a training method to help children to improve their reading skills has been described in which children are motivated by computer games.

The rewards given to users in conventional training methods are sometimes related to special interests or to the subject matter of the presented task.

A disadvantage of conventional training methods resides in that they do not present a reward which takes into account the age of the user.

It is well-known that old people have a good long-term memory, however often fail to memorize events which have happened recently. When presenting a reward to a user, such as a movie clip, the reward will be more enjoyed by the user when he can recognize the movie from which the movie scene was taken on the basis of his long-term memory.

Accordingly, it is one object of the present invention to provide a device and a method for training a user which increases a performance of the user.

The invention provides a training device for training at least one user comprising
  a user output interface for presenting at least one training task to said user;
  a user input interface for inputting a response of said user to each presented training task;
  means for detecting a performance of said user on the basis of the responses input by said user; and
  means for presenting rewards for the detected performance of said user, wherein said rewards are selected depending on a training date on which the responses are input by said user and depending on an age of said user.

In one embodiment of the training device according to the present invention said means for presenting rewards comprise a display screen, an audio speaker, a near-eye display and virtual-reality googles.

In one embodiment of the training device according to the present invention, said user output interface comprises a display screen, an audio speaker, a near-eye display and virtual-reality googles.

In one embodiment of the training device according to the present invention, said user input interface comprises a touch screen, a keyboard, a mouse, a touch pad, a stylus, camera and a microphone.

In a preferred embodiment of the training device according to the present invention, said training device has a network interface to a data network.

The data network is formed in one embodiment by the Internet.

The invention further provides a training system for training at least one user comprising
  a content server for storing a plurality of content data items;
  at least one training device for training a user, said training device being connected to said content server via a data network,
wherein said training device presents at least one training task to said user and detects a performance of said user on the basis of responses of said user to the presented training tasks;
  selection means for selecting content data items from the content data items stored in said content server depending on an age of said user and a training date on which the training of said user is performed; and
  presentation means for presenting selected content data items as a reward for the detected performance of said user.

The invention further provides a training device for training at least one user comprising
  means for presenting at least one training task to said user;
  means for detecting a performance of said user on the basis of responses of said user to the presented training tasks;
  means for presenting selected rewards to said user depending on the detected performance of said user, wherein each selected reward is selected from stored rewards on the basis of an age of said user such that a production date of said selected reward is within a time range when the user was young.

In a preferred embodiment of the training device according to the present invention, the time range for selecting a reward is adjustable.

In one embodiment of the training device according to the present invention, the time range covers a life period from 15 to 25 years of said user.

The invention further provides a training method for training at least one user comprises the followings steps:
  presenting at least one training task to said user;
  detecting a performance of said user in response to an input of said user;

scoring the detected performance of said user;
presenting selected rewards to said user depending on the scored performance;
wherein the presented rewards are selected depending on a training date on which the training method is performed and depending on an age of said user.

In one embodiment of the training method according to the present invention, the selected rewards have a production date which is calculated depending on the age of said user and the training date on which the training method is performed.

In one embodiment of the training method according to the present invention a further selection of the presented reward is performed on the basis of stored preferences of said user.

In one embodiment of the training method according to the present invention, the production date of the selected rewards lies within a time range which is calculated as follows:

$$\text{production date (PD)} = \text{training date (TD)} - \text{user age (A)} + \text{constant}_A \pm \text{constant}_B$$

In one embodiment of the training method according to the present invention, constant A is adjusted to 20 years and constant B is adjusted to be 5 years.

In one embodiment of the training method according to the present invention, the presented training tasks comprise mental tasks.

In an alternative embodiment of the training method according to the present invention, said presented training tasks comprise physical tasks.

In one embodiment of the training method according to the present invention, several training tasks are presented sequentially to said user in a training session.

In one embodiment of the training method according to the present invention, an input of said user to each presented training task is monitored.

In one embodiment of the training method according to the present invention, a performance of said user to each presented training task of a training session is detected and memorized in a performance history of said user.

In one embodiment of the training method according to the present invention, the next training task of the training session is selected depending on the memorized performance history of the user.

In one embodiment of the training method according to the present invention, the scoring of the performance of said user is performed by giving credit points to the user in response to the detected performance of said user.

In one embodiment of the training method according to the present invention, the credit points are given depending on the detected performance of the user, user credit parameters and task credit parameters.

In one embodiment of the training method according to the present invention, the user credit parameters comprise the age of the user, a mental ability of the user and a gender of the user.

In one embodiment of the training method according to the present invention, the task credit parameters comprise a type of the presented training task, a difficulty level of the training task, and a performance history of the user to the training task.

In one embodiment of the training method according to the present invention, a reward is formed by a collectable content data item.

In one embodiment of the training method according to the present invention, the content data item comprises a content identification, a content production date and content data.

In one embodiment of the training method according to the present invention, the collectable content data item further comprises a content type, content attributes, content rating attributes, and a content sequence identification.

In one embodiment of the training method according to the present invention, the content data comprises video data, audio data and image data.

In one embodiment of the training method according to the present invention, the training task comprises a training task identification, a training task type, training task attributes, training task rating attributes, and training task data.

In one embodiment of the training method according to the present invention, the collectable content data items having the same content identification are collected by the user to assemble a complete content file.

In one embodiment of the training method according to the present invention, the assembled content file comprises collected data items in the order of the respective content sequence identifications of said content data items.

In one embodiment of the training method according to the present invention, the user age is input by the user.

In an alternative embodiment of the training method according to the present invention, the user age is input by a trainer.

In a still further alternative embodiment of the training method according to the present invention, the user age is downloaded from a user data base via a network.

In one embodiment of the training method according to the present invention, the user age is estimated automatically from a performance and/or a content and task rating history of the user.

In a further embodiment of the training method according to the present invention, the reward is formed by dispensing a good, such as a cookie to the user.

In one embodiment of the training method according to the present invention, the training task is formed by a memory training task.

In an alternative embodiment of the training method according to the present invention, the training task is formed by a cognitive training task.

In an alternative embodiment of the training method according to the present invention, the training task is formed by an auditory training task.

In an alternative embodiment of the training method according to the present invention, the training task is formed by a vision training task.

In an alternative embodiment of the training method according to the present invention, the training task is formed by an attention training task.

In a further embodiment of the training method according to the present invention, the training task comprises prompting an aural stimulus to the user.

In a further embodiment of the training method according to the present invention, the training task comprises prompting to the user a visual stimulus.

In a further embodiment of the training method according to the present invention, the content data is formed by a movie clip showing a scene from a movie.

The invention further provides a training method for training at least one user comprising the following steps:

selecting rewards depending on a training date (TD) on which a training of said user is performed in a training session (TS) and depending on a birth date (BD) of said user; and presenting said selected rewards depending on a detected performance (p) of said user.

In a preferred embodiment of the training method according to the present invention, each selected reward has a production date which lies within a time range that is calculated as follows:

$$\text{production date (PD)} = \text{user birth date (BD)} + C_A \pm C_B$$

wherein constant $C_A$ and constant $C_B$ form adjustable time constants.

In one embodiment of the training method according to the present invention, the birth date of the user and the constants $C_A$, $C_B$ are input by said user.

In an alternative embodiment of the training method according to the present invention, the birth date and the constants $C_A$, $C_B$ are input by a trainer or downloaded from a data base via a network.

In a preferred embodiment of the training method according to the present invention, the selected rewards are downloaded from a content server via a network.

In an alternative embodiment of the training method according to the present invention, the presented rewards are input from a data carrier.

The invention further provides a method for motivating a user to perform a training task, said method comprising:
presenting to said user a training task (t);
recording a response by said user to said training task (t);
scoring a user's performance (p) for said training task (t); and
on the basis of the scoring of step (c), playing or withholding from said user a content data item,
wherein the content data item is selected depending on a training date (TD) on which the method is performed and depending on an age (A) of said user.

In one embodiment of the training method according to the present invention, on the basis of the scoring, the length of the presented content data item is adjusted.

In a further embodiment of the training method according to the present invention, the presenting, recording and scoring as well as the presentation of rewards are repeated to provide the user with several different collectable content data items which are combined and presented in combinated form to the user.

In one embodiment of the training method according to the present invention, the training task comprises one or more questions, wherein the subject matter of the questions and the subject matter of the content data item are taken from the same historical event, movie, song or book.

In one embodiment of the training method according to the present invention, the user has an age of more than 50 years.

The invention further provides a method for improving a mental capacity of a user wherein said method comprises:
presenting to said user a training task (t);
recording a response of said user to said presented training task (t);
scoring a user's performance (p) for said presented training task (t); and
on the basis of the scoring of step (c), playing or withholding from said user a content data item,
wherein the content data item is selected depending on a training date (TD) on which the method is performed and depending on an age (A) of said user.

In one embodiment of the training method according to the present invention, the user is diagnosed as having a diminished mental capacity.

In a further embodiment of the training method according to the present invention, the diminished mental capacity is due to Alzheimer's disease, a stroke or a head injury.

In one embodiment of the training method according to the present invention, the diminished mental capacity is age-related.

In the following embodiments of the training device and the training method according to the present invention are described with reference to the enclosed figures.

FIG. 1 shows a preferred embodiment of the training device according to the present invention;

Figure 2:
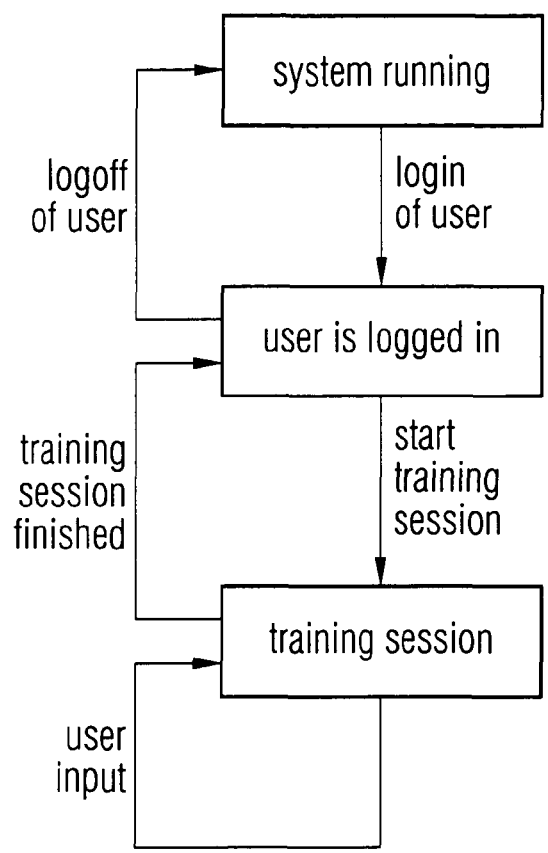
FIG. 2 shows a state diagram of the training system according to the present invention.

FIG. 1 shows an embodiment of a training device 1 according to the present invention provided for training at least one user 2. The training device 1 comprises a user output interface 3 for presenting at least one training task t to the user 2. The user output interface 3 comprises, for example, a display screen, an audio speaker, near-eye displays and virtual-reality googles.

The training device 1 according to the present invention further comprises an user input interface 4 for inputting a response of an user 2 to each presented training task t. The user input interface 4 comprises, for example, a touch screen, a keyboard, a mouse, a touch pad, a stylus, a camera or a microphone.

The user output interface 3 and the user input interface 4 are both connected to a processor 5.

The training device 1 further has a presentation unit 6 for presenting rewards or a detected performance of the user 2 wherein the rewards are selected by the processor 5 depending on a training date TD on which the responses of the user 2 are input into the user input interface 4 and depending on an age A of said user 2. An additional selection may be performed depending on stored preferences of said user. The presentation unit 6 comprises a display screen, an audio speaker, a near-eye display and virtual-reality googles.

The processor 5 is connected in one embodiment of the training device 1 to a network interface 7. Via the network interface 7, the training device 1 is connectable to a data network 8, such as the Internet or a local area network LAN.

The content server 9 for storing content data items is connected to the data network 8. The presentation unit 6, the user output interface 3 and the user input interface 4 can be formed, for example, by an integrated screen, which is used both, for presenting training tasks t to the user 2 monitoring the responses of the user 2 to the presented tasks t, and displaying the selected rewards to the user 2. For instance, the user 2 may touch items shown to him on the screen during a training session TS.

The training device 1 comprises in one embodiment a memory 10 for storing a performance history (PH), a content rating history (CRH) and a task rating history (TRH) of the user 2. The memory 10 further stores the credit point account of user 2 and user parameters, such as his age (A) or his ability level.

In one embodiment of the training system according to the present invention, several training devices 1 are connected to a common data network 8.

FIG. 2 shows a state diagram of a training system according to the present invention as shown in FIG. 1.

First, the training system is switched on. Then the user 2 or his trainer may perform a log-in to the training system. The user 2 or his trainer can select a training session TS, which sequentially presents a training task t to the user 2 via the user output interface 3. After each user input via the user input interface 4, the next training task t is presented.

After powering up the training system, the training system monitores the time how long the training system is running, how many training sessions TS have been performed, and how long an average training session did last. Further, the training system monitors how many users 2 have used the system.

After a log-in of a user 2, the training system reads from its data base how many training sessions TS the user 2 has already performed. Further, in one embodiment, the preferences of the user 2 are stored, wherein the preferences are, for instance, detected by input of a rating by said user 2. A further possible information held by the training system is how many times the current user 2 has given up on the presented training tasks t and how long the current user stayed in one training session TS. Furthermore, credit points calculated by scoring the detected performance p of the user 2 are memorized and the number and type of rewards earned by the user 2 are stored.

After the user 2 has started the training session TS, the training system notes from a performance history PH of the user 2 how many times the current user 2 did give up on the presented task t, an average training time for the current training session TS, an ability level of the user 2, and preferences of the user 2 for presented tasks from a rating history of said user 2.

Figure 3:
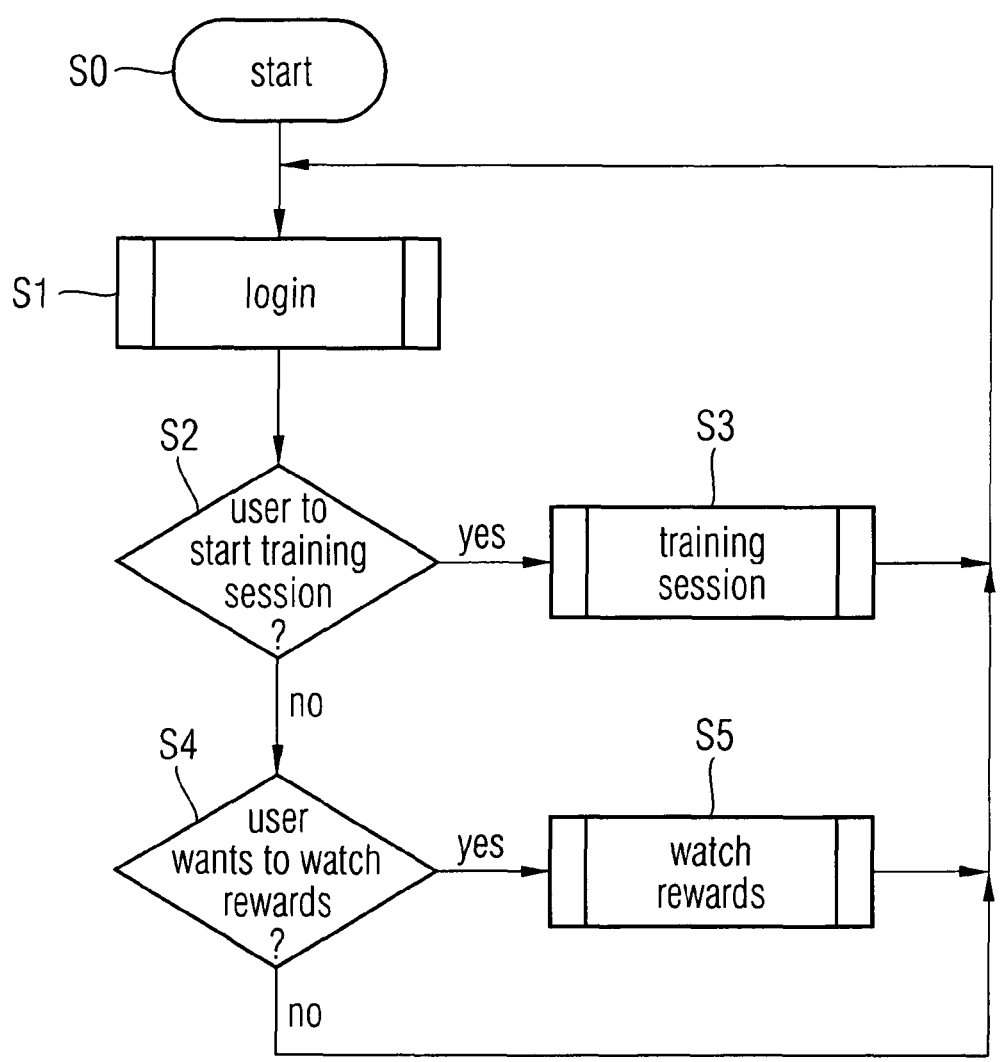
FIG. 3 shows a flow-chart for illustrating an embodiment of the training method according to the present invention.

FIG. 3 shows a flow-chart for illustrating the training method according to the present invention.

After starting the training system in step S0, the log-in of the user 2 is performed in step S1.

In one embodiment, several possible training sessions TS are presented to the user 2 via the user output interface 3.

In step S2 it is monitored whether the user 2 wants to start a specific training session TS. When the user 2 has selected a training session TS which comprises at least one training task t, the training session is performed in step S3.

If the user 2 does not select a training session TS, it is decided in step S4 whether the user 2 wants to receive a reward, for instance whether he wants to see a movie clip.

If the user 2 has selected a reward, the movie clip is presented to the user 2 in step S5 via the presentation unit 6.

In an alternative embodiment of the training method according to the present invention, some rewards are also shown during the training session in step S3 for motivation of the user 2.

Figure 4:
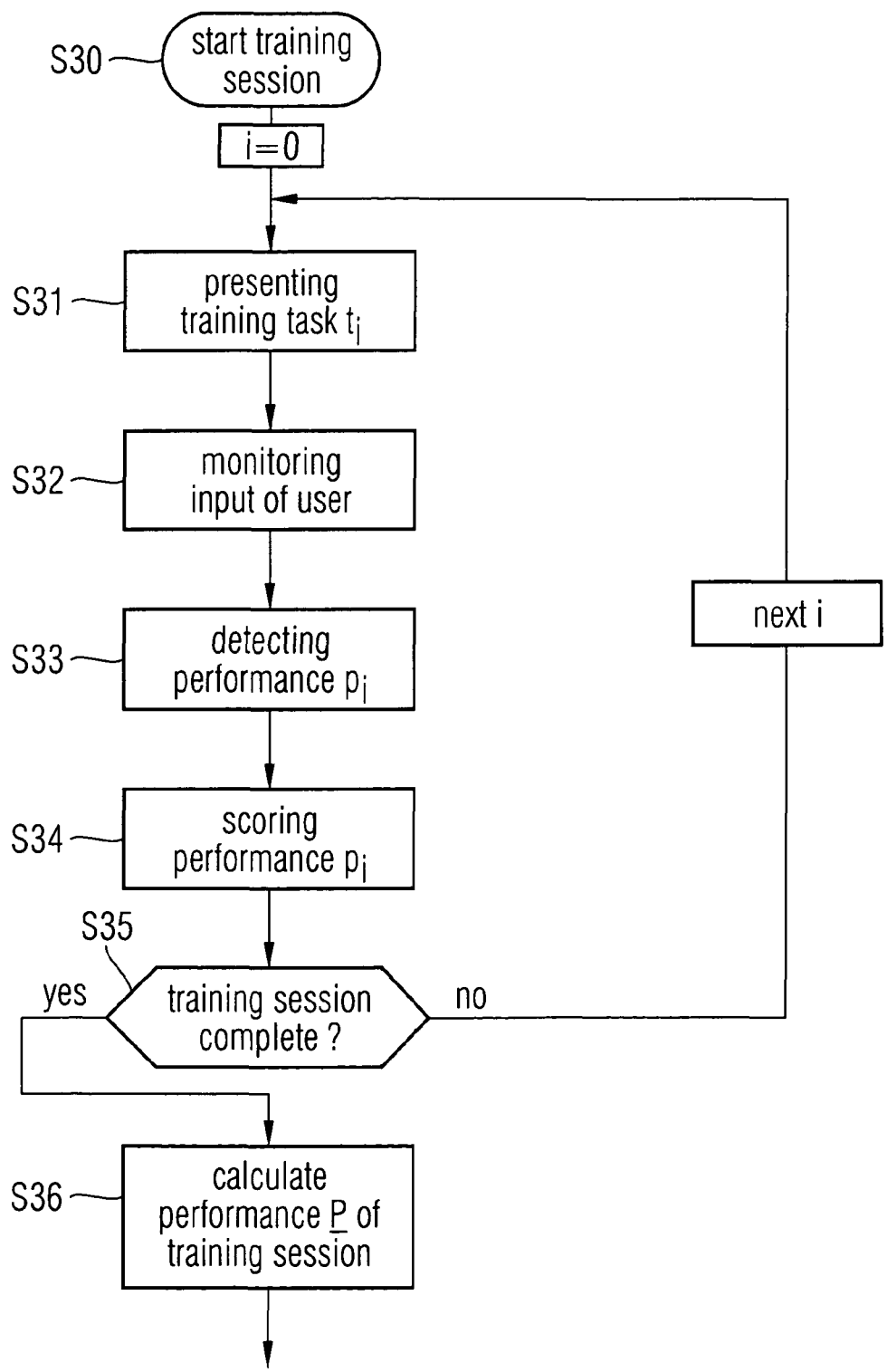
FIG. 4 shows a further flow-chart for illustrating the training method according to the present invention.

FIG. 4 shows a flow-chart of a training session TS as performed in step S3. After starting the training session TS in step S30, a first training task t is presented to the user 2 via the user output interface 3 in step S31.

The processor 5 monitors an input of the user into the input interface 4 in step S32. When the user 2 has input a response to a presented task $t_c$, $t_i$, the corresponding performance pi is calculated by the processor 5 in step S33. The performance p of the user 2 depends on the portion of correct reactions of the user 2 to the presented task t in relation to wrong reactions of the user 2 to the presented training task t.

In a further step S34, the detected performance p of the user 2 to the presented task t is scored by the processor 5. In one embodiment, the processor 5 calculates credit points CP for the detected performance p. The credit points CP are calculated by the processor 5 depending on the detected performance p of the user 2 and further parameters, such as user credit parameters and task credit parameters.

The user credit parameters comprise the age A of the user 2 and a stored mental ability of the user 2 and other user parameters, such as the gender of the user 2. More credit points CP are given to a user 2 who has a high age and whose mental ability is low.

The task credit parameters comprise the type of the presented training task t, a difficulty level of said training task t and a performance history PH of the user 2 for the training task t.

More credit points CP are given to the user 2 when the difficulty level of the training task t is high and the performance history PH to the training tasks t or similar training tasks show that his performance p in the past was bad. The user 2 who fulfils a training task t which he could not fulfil in the past will be given more credit points CP.

In one embodiment of the training method according to the present invention, the next presented training task $t_{i+1}$ is selected by the training system automatically in reaction to the performance $P_i$ of the user 2 to the last training task $t_i$. In this way, a training system according to the present invention can adapt the difficulty level of the training task t depending on the actual performance p of the user 2 so that the training session TS does not become boring for the user 2. On the other hand, it is possible for the training system to lower the difficulty level of a training task t if the performance history PH of the user 2 in the training session TS shows that the presented tasks t are too difficult for him.

In a step S35, it is checked whether a training session TS is completed or whether the user 2 has finished the training session TS.

After completion of the training session TS, the performance $P_{TS}$ of the user of the whole training session TS is calculated on the basis of the detected performances $p_i$ of the user to each presented training task $t_i$. In one embodiment, the training session performance $P_{TS}$ is calculated by adding the detected performances $p_i$.

Training tasks t which are presented to the user in step S31 are in one embodiment mental training tasks $t_m$.

In an alternative embodiment, the presented training task t is a physical training task $t_p$, such as lifting an object having a certain weight. The lifting of the object may be monitored by the processor 5 via a camera forming a user input interface 4.

In one embodiment, the user output interface 3 may be formed by a mechanical device and the user 2 has to exert a physical force F against the mechanical device 3, which is measured by the processor 5. Accordingly, the performance pi detected by the training device 1 according to the present invention can be a mental performance $P_m$ of the user 2, but also a physical performance $P_p$ of the user 2.

A mental training task $t_m$ is any prompt requiring a response from the user 2 including memory training, e. g. semantic memory, episodic memory and/or short-term memory. A mental training task includes cognitive training, auditory training, vision training and attention training. A training task t can be selected by the system according to the needs of the user.

Memory training is a task which tests the ability of the user to recall information.

Cognitive training comprises tasks which tests the cognitive ability of the user. Cognitive training tasks can be, for example, such as described in U.S. Pat. No. 6,632,174.

An auditory training task tests the hearing of the user 2 by presenting aural stimuli to the user 2. An auditory training task can be, for example, such as described in U.S. Pat. No. 6,146,147.

A vision training task is a training task which tests the user's vision by presenting visual stimuli to the user 2. A vision training task can be, for example, such as described in U.S. Pat. No. 6,464,356.

An attention training task is a task which tests the attentional ability of the user 2. An attention training task can be, for example, such as described in U.S. Pat. No. 5,377,100.

By presenting training tasks t to a user 2, it is possible to train different kind of memories, such as a semantic memory, an episodic memory and a short-term memory of the user 2.

A semantic memory is a memory of predetermined facts, objective information and/or public information, such as vocabulary, names, historic events.

An episodic memory is a memory of the user 2 for unique experiences, subjective impressions and personal feelings that a user may recall from his or her experiences. An episodic memory is sometimes also known as an experiential memory.

A short-term memory refers to recall information obtained by a user 2 within a short period of time, e. g. between a few seconds and a few hours. A short-term memory is also known as a working memory.

In one embodiment of the training method according to the present invention, the user 2 can rate the given training task t, e. g. the user 2 can input whether he enjoyed the presented training task t or not. The system will adapt the type and difficulty level of the presented training task t in response to the given rating of the user 2. The rating is memorized in the memory 10 as a task rating history TRH of said user 2.

After the user 2 has completed the training session TS, he may wish to receive a reward for his performance p by converting credit points CP into corresponding rewards. A reward is formed in one embodiment of the training method according to the present invention by a collectable content data item CDI.

Figure 5:
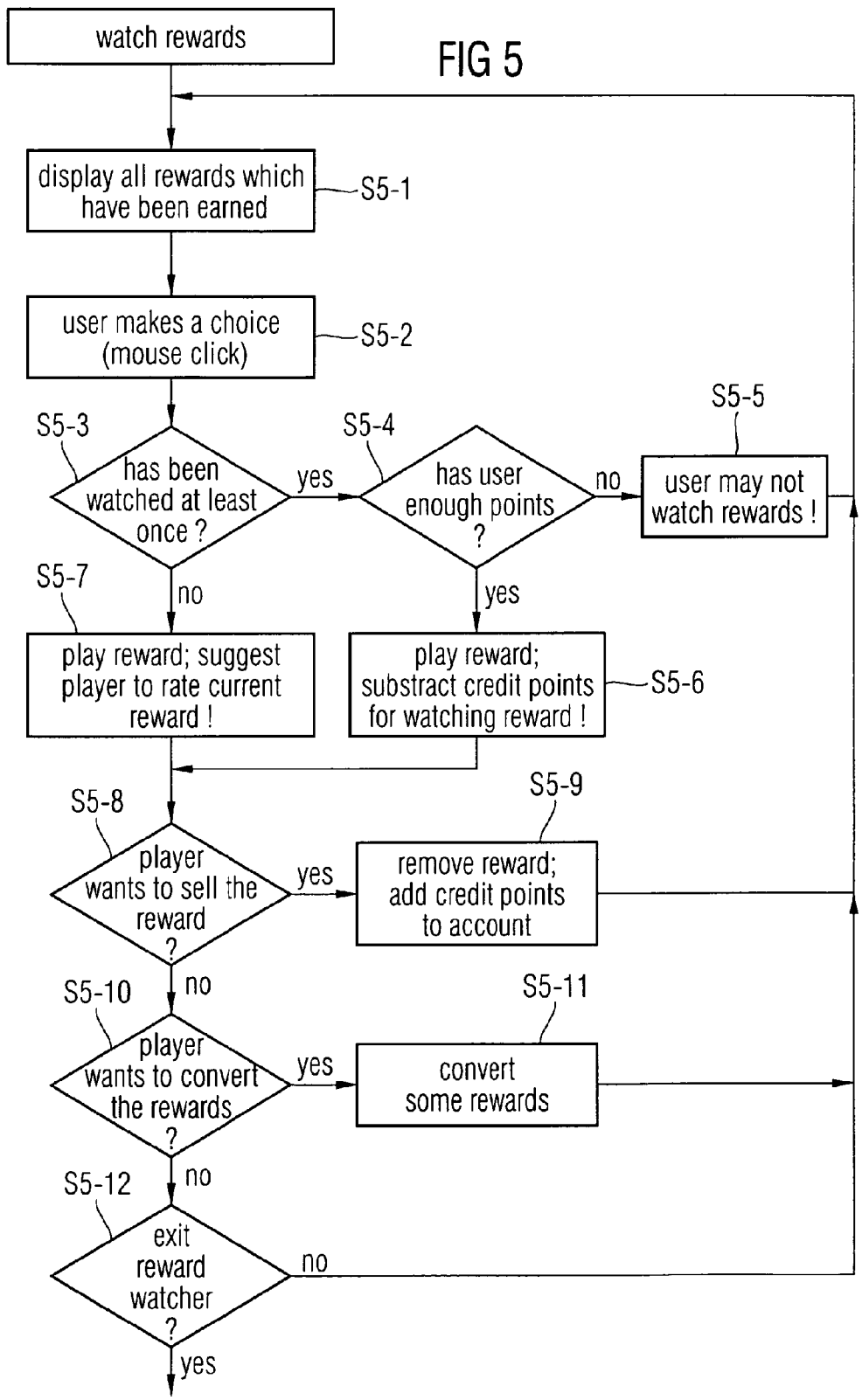
FIG. 5 shows a further flow-chart for illustrating the training method according to the present invention.

FIG. 5 shows a flow-chart illustrating the watching of the reward by the user 2 according to one embodiment of the training method of the present invention.

In a step S5-1, all rewards which are currently in possession of the user 2 are displayed.

In step S5-2, the user 2 may choose any rewards in his possession by clicking a mouse.

In step S5-3, it is decided whether the user 2 has watched the reward at least once or not. If the user 2 has already reached the reward, it is decided in step S5-4 whether the user 2 has enough credit points CP for the reward. If the accumulated credit points CP of the user 2 are not sufficient for the chosen reward, it is detected in step S5-5 that he has not enough credit points CP and that he has to fulfil more tasks t to get the reward.

If the user 2 has enough credit points CP, the chosen reward is presented to him and a corresponding number of credit points CP is substracted for watching the reward in step S5-6.

If in step S5-3 it is detected that the user 2 has not yet seen or listened to the chosen reward, it is sent to him in step S5-7 and the user 2 is asked to rate the current reward. The rated current reward is memorized in a reward rating history PRH of the user 2. If the reward is shown for the first time, it is rated by the user 2. In this manner a feedback loop is created in the training system according to the present invention. The rewards which the user 2 likes very much are shown more often than rewards which he does not like. Watching a reward for a second, third time or even more often, will cost him credit points CP.

In a possible embodiment of the training method according to the present invention, the user 2 is asked by the system whether he wants to sell the acquired reward. The user 2 may choose to sell the current reward and credit points CP will be refunded to him in step S5-9.

In a step S5-10, the user 2 may decide to convert some of his rewards into other rewards. The user 2 may, for example, choose to exchange three teasers, i. e. short-data content clips, into one longer data content clip.

In step S5-12, the user 2 may exit the process.

Figure 6:
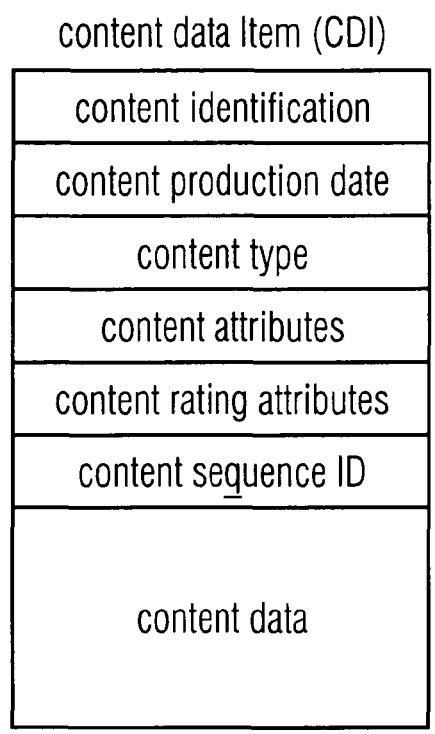
FIG. 6 shows a data format of a content data item as used by the training method according to the present invention.

FIG. 6 shows a data format of a content data item CDI which may form a reward for the user 2.

The content data item CDI comprises a content data identification, a content production date, a content type, content attributes, content rating attributes, a content sequence identification and content data, such as video, audio or image data. The content production date PD indicates the date when the content data was produced. It may, for instance, indicate that a movie clip forming content data was part of a movie which was produced in 1938.

A content sequence identification SID indicates the position of the collectable content data item CDI within a complete content file. Collectable content data items having the same content identification CID can be collected by the user 2 to assemble a complete content file, such as a complete movie.

In a preferred embodiment, the assembled content file comprises collected content data items CDI in order of the respective content sequence identifications SID of said content data items CDI. Content data may be formed by a complete movie which is divided up into several content items, wherein each content data item CDI shows a scene from the movie. The user 2 will try to collect all content data items CDI of one content file. When the content data of one content data item CDI is displayed to the user 2, he may rate the movie scene, i. e. he may rate whether he enjoyed the movie scene. The rating of the user 2 is stored as content rating attributes in the content data items CDI and an as a content rating history CRH of the user 2 in the memory 10 of the training device 1.

Figure 7:
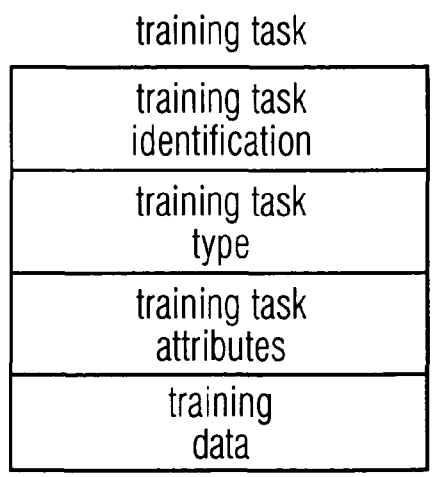
FIG. 7 shows a data format of a training task as used by a training method according to the present invention.

FIG. 7 shows a data format of a training task t presented to the user 2 via the user output interface 3. The training task t comprises a training task identification TID, a training task type, training task attributes including training task rating attributes and training data. During a training session TS, the user 2 may rate the presented training task t. This is memorized as training task attributes in the training task t and as training task rating history TRH of the user 2 in the memory 10 of the training device 1.

In one embodiment of the training method according to the present invention, the age A of the user 2 is not input by the user 2 and is not downloaded from a data base, but calculated from the rating history RH of the user. This rating history RH includes the rating of the presented training tasks (TRH) and the history of the rating of the presented rewards (CRH). The estimation or calculation of the age A may also take into account the performance history PH of the user 2:

$$A = f(PH, CRH, TRH)$$

In an alternative embodiment the training device 1 presents a physical task tp to the user 2 and estimates from his physical performance his age A. For example, the training device 1 will measure the heart rate of the user 2 in response to a presented physical task tp.

Figure 8:
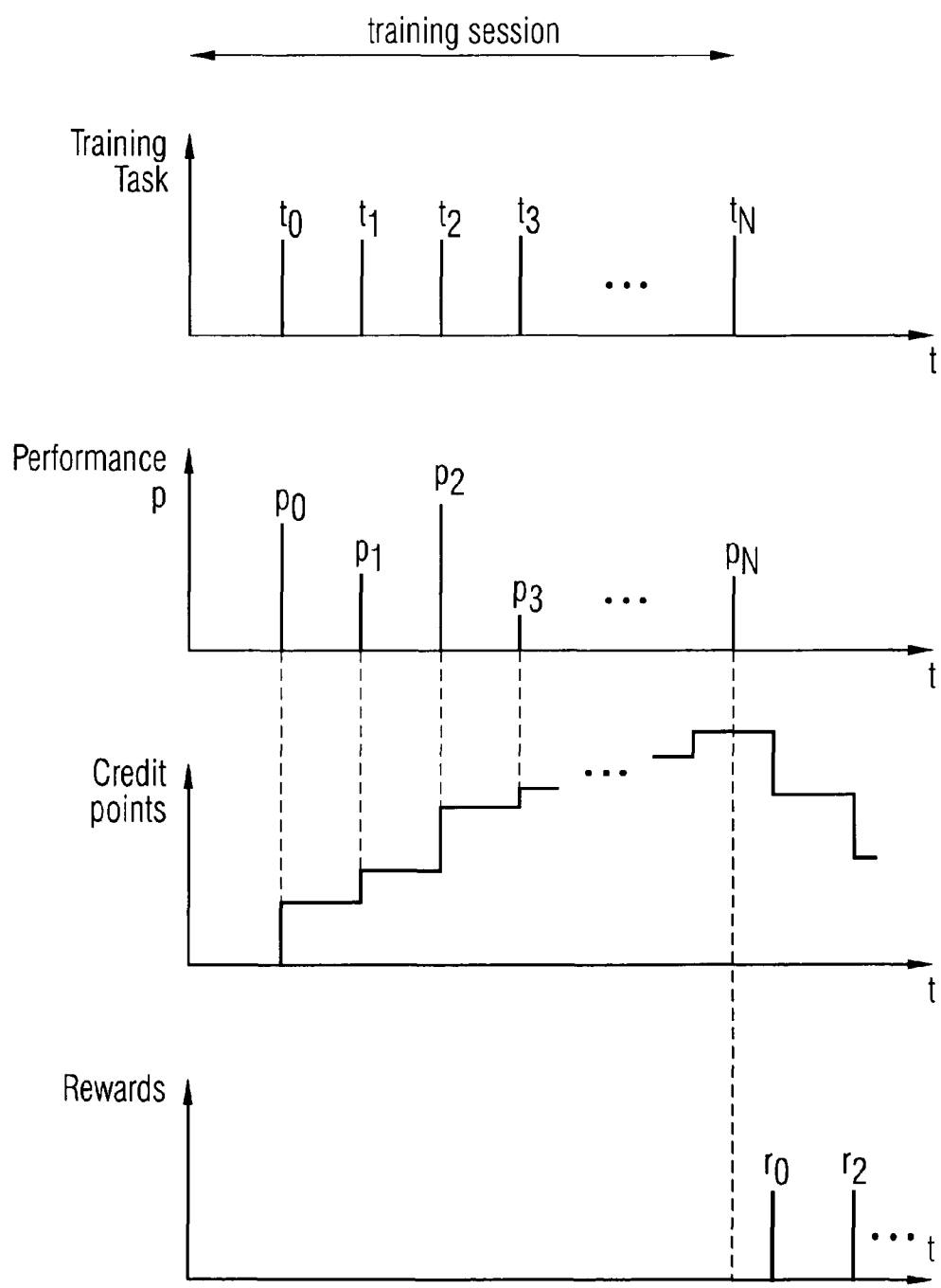
FIG. 8 shows diagrams for illustrating an embodiment of the training method according to the present invention.

FIG. 8 shows a diagram illustrating the training method according to the present invention. In a training session TS, a sequence of training tasks $t_i$ is presented to the user 2. The performance p of the user 2 is detected by the training device 1 and scored to calculate credit points CP. After the training session TS, the user 2 selects rewards and credit points CP are substracted from his credit point account CPA stored in the memory 10 of the training device 1.

In an alternative embodiment, the rewards are output to the user 2 by a training device 1 automatically, i. e. the training device 1 selects the rewards output to the user 2. The selection is performed based on the memorized rating history TRH, CRH and optionally also related to the subject matter of the presented training tasks t. In one embodiment, the training task t comprises one or more questions. The subject matter of the presented questions and the subject matter of the presented content data items CDI, i. e. the reward, can be taken from the same historic event, movie, song or book.

Figure 9:
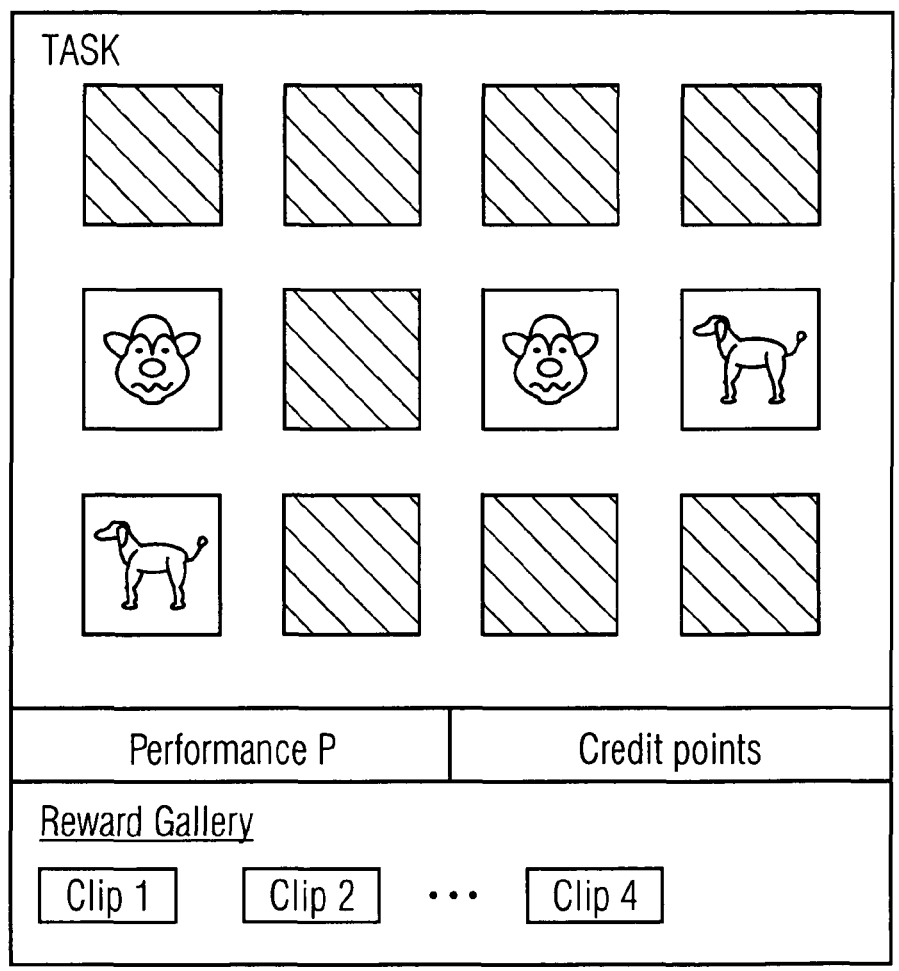
FIG. 9 shows an example for a presented training task in one embodiment of the training method according to the present invention.

FIG. 9 shows an example for illustrating the training method according to the present invention. In the given example, the training task t is formed by a mental training game, wherein the user 2 has to remember two identical pictures of a group of pictures displayed to him. Initially, all pictures are blank and the user starts to select the pictures by touching a screen. After having touched a frame, the picture is displayed to him for a certain time and after that the picture frame is blank again. The user tries to memorize two identical pictures and after having touched two identical pictures in a relatively short time, both pictures are displayed to him continuously reducing the number of choices for the user 2, thus facilitating the remaining task. The training session TS ends when all corresponding pairs of pictures have been found by the user 2.

Optionally, the user 2 can see his performance p to the training task t and the credit points CP given to him for fulfilling the training task t.

Furthermore, a reward gallery is shown to the user 2 including several collectable content data items CDI, such as movie clips. The user 2 can collect several content data items CDI to a complete content file, such as a complete movie.

When watching a movie clip, the user 2 is informed in one embodiment, for example about locations where he can see the complete movie, by displaying a cinema program or a television program to him.

Figure 10:
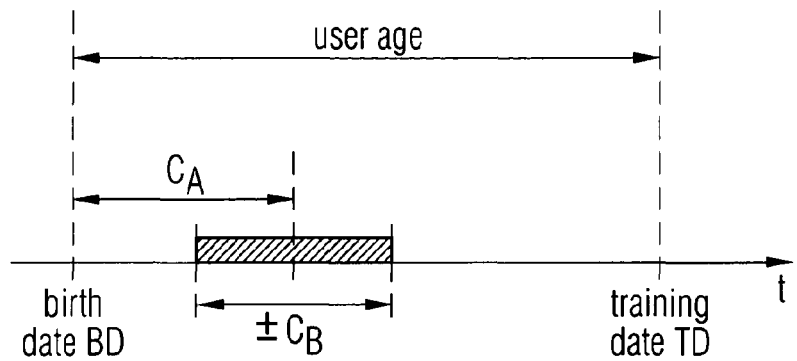
FIG. 10 shows a diagram for illustrating the calculation of a production date of a content data item presented to the user as a reward in one embodiment of the training method according to the present invention.

Each content data item CDI comprises a data field indicating the production date PD of the content data item CDI. The selection of a content data item CDI presented to the user 2 as a reward is performed on the basis of an age A of said user 2 and on the basis of the actual training date TD when the training method is performed as illustrated in FIG. 10. From the actual training date TD, for example Jul. 11, 2006, the age A of the user 2 is substracted to calculate the year when the user 2 was born. Is the user 2, for instance 80 years old, the calculated year is 1926. Then, a first time constant $C_A$ is added to the calculated birth year of the user 2, for example, a time constant $C_A$ of 20 years. In the given example, the calculated year is 1946. A further adjustable time constant $C_B$ of, for example, five years determines a specific production time range.

An admissable production date PD of a selected reward depends on the training date TD and the age A of the user 2 as follows:

$$\text{production date PD} = \text{training date TD} - \text{user age} + \text{constant } C_A \pm \text{constant } C_B.$$

In the given example, the user 2 will only receive rewards which have a production date PD ranging from 1941 to 1951. This is a time range, wherein the user 2 was a young person and it is likely that he can remember the presented content, because as an old person he has a good long-term memory.

In a possible embodiment of the present invention, the user 2 will first collect individual movie clips from famous movies. These movie clips can be collected and combined by the user 2 to view the entire movie. The rewards, such as movie clips can be stored either on the training device 1 in an integrated memory, or the input from a data carrier, such as a CD, DVD or a hard-disk.

In another embodiment, the collectable content data items CDI are downloaded via the data network 8 from a content server 9. The download of the content data item CDI is controlled by the training device 1.

As an example, the movie clip might be taken from a famous movie, such as "Casablanca" and the collectable content data item CDI can be formed by a movie clip showing the scene where Humphrey Bogart kisses Ingrid Bergman saying: "Kiss me, baby.". Such a movie clip is of particular motivational value, because elder people tend to remember more readily events in movies that happened a long time ago. Typically and preferentially presented movies are movies which were popular during their young and early adolescent age. Such movies or movie clips evoke memories not only of the movie itself, but perhaps also other memories of significant events which happened at the time when the movie was popular. In addition, the old movie clip gives the user 2 a temporary sense of being young again.

The subject matter of the presented task t may be related to the same time period as the presented rewards. In one embodiment, the user 2 has to memorize, for example, famous faces or persons who were famous at this time, such as Marilyn Monroe, Liz Taylor and so on.

The content data can also be formed by audio data, such as a Beatles-song. Another variation is that the content data item CDI comprises clips of famous speeches, such as Martin Luther King: "I have a dream". An advantage of audio clips is, that in contrast to movie clips they require less memory space.

In a further embodiment, several training devices 1 are connected to a common data network 8, so that different users 2 can jointly perform a training session TS. For instance, several users 2 can perform a training session TS independently and collectively accumulate credit points CP to jointly watch the reward. This enhances social interaction between the users 2 and reduces the user's social isolation.

The training system according to the present invention even allows a competition between several users 2, for instance, elderly people who live in an old people's home.

Figure 11:
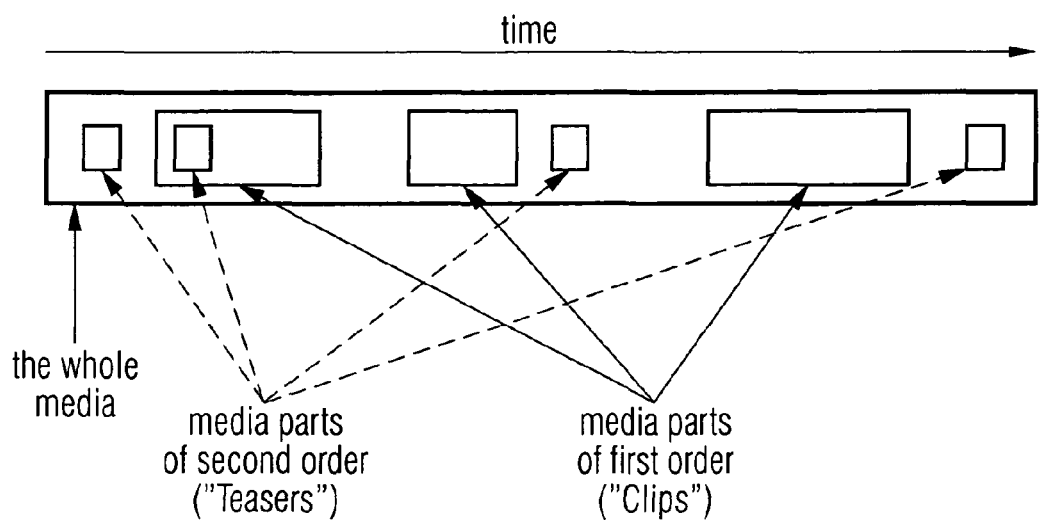
FIG. 11 shows an example for collectable movie clips used as rewards in one embodiment of the training method according to the present invention.

FIG. 11 shows a diagram for illustrating the cutting of a media file into parts to create connectable content data items CDI.

In one embodiment of the training method according to the present invention, the user 2 is presented with a mix of physical and mental tasks t. The training device 1 according to the present invention comprises a training component and a reward component. The works for a memory clip presented to the user 2 as a reward can be of any length and of any content, e. g. content of movies, television, commercials, radio shows, commercial jingles, or popular songs. For example, short works of, e. g. one to three minutes or longer movie clips of, e. g. five minutes can be presented as a reward depending on the performance p of the user 2. Alternatively, entire works, e. g. complete movies or songs can be obtained either by accumulating enough credit points CP by repeating the training exercise or by collecting individual segments of a movie and later combining the segments to reveal the work in its entirety.

For example, a user 2 who is 65 years old, might perform a memory training task for 30 minutes each day. Upon reaching a predetermined number of correct answers in a memory task t, the user 2 has earned enough credit points CP at the end of the training session TS. Afterwards, the user 2 will be permitted to view a short clip from a movie. For the 65 years old person, the program may allow access to movie clips which were popular in the 1950s, e. g. at a time when the user was about 20 years old. The movie clip might be taken from a popular movie at that time, such as "Casablanca". Optionally, the movie or the user's favorite scene may be preselected prior of starting the training session TS.

Content data items CDI can be selected which are of interest to younger users, as well. For example, a 40-year-old may want to listen to music performed by the Beatles. Thus, the method and the device 1 according to the present invention can appeal to users 2 of all age groups.

The method according to the present invention can be performed in connection with a number of electronic devices. The method can be performed by using a computer, such as a home computer, a personal computer, a school computer, a laptop, a cellphone, a personal digital assistant (PDA), a gaming console, or other devices which can run programs. A program performing the method according to the present invention can be pre-recorded on recording medium and delivered to the user by disk, CD-ROM, or downloaded via the Internet. A computer network and various computing devices can be used alone or in a network configuration in accordance with the present invention. The devices may comprise computer-type devices employing various types of user inputs, displays, memories, processors, such as typical PCs, laptops, servers, gaming consoles, PDAs and cellphones. For example, the computing devices can be connected via a communication network, such as a local area network LAN, a wide-area network WAN or the Internet. The communication networks can be wired, wireless or a combination thereof. For example, the program can be run from a server and distributed to the user computer over a network to user computers running web browsers, such as "Microsoft Internet Explorer" or "Netscape Navigator".

The training device 1 according to the present invention is in one embodiment programmed to prompt the user 2 to begin the training session TS using an auditory command, such as "Come on!" and "Touch my screen!", and then ask for the name of the user 2. Furthermore, the questions or any other stimulus can be presented to the user 2 aurally, e. g. via a speaker, visually, e. g. on a computer screen, or both, aurally and visually. The training session TS can be configured to automatic adapt to the user's performance level, so that the task t is neither too easy nor too difficult, thus keeping the user 2 always at an intermediate performance level. The training session TS can also be configured to provide real-time feedback about the user's performance in the training task t. Such real-time feedback can be used to further increase the motivation of the user 2 to complete a task or session.

In one embodiment of the training device 1 voice recognition means are provided for recognising the voice of the user 2 for his identification and for inputting commands of said user 2.

The selection of the presented rewards is performed by selection means which are either provided in the training device 1 or in a content server 9 from which the selectable content data items CDI are downloaded.

In a possible embodiment of the training system according to the present invention, the content server 9 has a user data base which stores of each user 2 the corresponding age A. Only collectable data items CDI having a fitting production date PD are transferred to the training device 1 via the data network 8. This has the advantage that the training device 1 only has to store content data items CDI which are adapted to the age A of the user 2.

In one embodiment of the training system according to the present invention the memory profile of user 2 is measured. It is measured which period of time the user 2 can remember best. For instance it can be detected that the user has a good long time memory for all events which happened between 1930 and 1940. The long time memory profile of the user 2 might be measured in one embodiment by displaying pictures of famous persons which were well known at a certain time such as actors or politicians and by asking the user 2 to identify these persons. In one embodiment of the training system according to the present invention the selection of the content data items CDI is performed also depending on the detected long time memory profile LTMP of the user 2. The detection of the long time memory profile LTMP of the user 2 may be performed in one embodiment automatically during the training session TS by evaluating responses given to presented tasks. The memory profile LTMP of the user 2 is stored in a memory. Accordingly in one embodiment of the training device 1 according to the present invention the rewards given to the user 2 are selected depending on a training date TD which responses our input by said user 2 and depending on the age A of said user as well as depending on the detected long time memory profile LTMP of the user 2.

The invention claimed is:

1. A training device for training at least one user comprising:
   (a) a user output interface for presenting at least one training task to said user;
   (b) a user input interface for inputting a response of said user to each presented training task;
   (c) a processor for detecting a performance of said user on the basis of the responses input by said user; and
   (d) wherein said processor calculates an admissible production date range depending on an age of the user and depending on a training date wherein a content data item having a production date within the calculated production date range is selected by said processor as a reward; and
   (e) a presentation unit for presenting the selected reward, wherein the production date lies within a time range which is calculated as:

$$\text{production date} = \text{training date} - \text{user age} + \text{constant}_A \pm \text{constant}_B.$$

2. The training device according to claim 1, wherein said presentation unit for presenting rewards comprises a display screen, an audio speaker, a near-eye display and virtual-reality goggles.

3. The training device according to claim 1, wherein said user output interface comprises a display screen, an audio speaker, a near-eye display and virtual-reality goggles.

4. The training device according to claim 1, wherein said user input interface comprises a touch screen, a keyboard, a mouse, a touch-pad, a stylus, a camera and a microphone.

5. The training device according to claim 1, wherein the training device comprises a first memory for storing a performance history of the user.

6. The training device according to claim 1, wherein the training device comprises a second memory for storing credit points accumulated by said user.

7. The training device according to claim 1, wherein the training device comprises a third memory for storing a content and task rating history of said user.

8. The training device according to claim 1, wherein the training device comprises a fourth memory for storing user credit parameters.

9. The training device according to claim 1, comprising first selection means for preselecting said rewards depending on a training date on which the responses are input by said user and depending on an age of said user and second selection means for selecting rewards from said preselected rewards depending on preferences of said user stored as user parameter data stored in a memory.

10. A training system for training at least one user comprising:
(a) a content server for storing a plurality of content data items;
(b) at least one training device for training a user, said training device being connected to said content server via a data network, wherein said training device comprises a processor which detects a performance of said user on the basis of responses of said user to presented training tasks and which selects content data items from the content data items stored in said content server depending on an age of said user and a training date on which the training of said user is performed; and a presentation unit for presenting the selected content data items as a reward for the detected performance of said user,
wherein the content data items comprise a content identification, a content production date, and content data, and
wherein the production date lies within a time range which is calculated as:

$$\text{production date} = \text{training date} - \text{user age} + \text{constant}_A \pm \text{constant}_B.$$

11. A training device for training at least one user comprising:
(a) a user output interface for presenting at least one training task to said user;
(b) a processor for detecting a performance of said user on the basis of responses of said user to the presented training tasks;
(c) a presentation unit for presenting selected rewards to said user depending on the detected performance of said user,
wherein each selected reward is selected by said processor from stored rewards on the basis of an age of said user such that a production date of said selected reward is within an adjustable time range when the user was young,
wherein a content data item having a production date within the calculated production date range is selected by said processor as a reward, and wherein the production date lies within a time range which is calculated as:

$$\text{production date} = \text{training date} - \text{user age} + \text{constant}_A \pm \text{constant}_B.$$

12. A training method for training at least one user comprising the following steps:
(a) presenting at least one training task to said user via a user output interface;
(b) detecting a performance of said user in response to an input of said user into a user input interface;
(c) scoring the detected performance of said user by a processor wherein the processor calculates an admissible production date range depending on a training date at which the responses are input by said user;
(d) selecting a content data item having a production date within the calculated production data range as a reward; and
(e) presenting selected rewards to said user depending on the scored performance,
wherein the production date of the selected reward lies within a time range which is calculated as follows:

$$\text{production date} = \text{training date} - \text{user age} + \text{constant}_A \pm \text{constant}_B.$$

13. The training method according to claim 12, wherein
a performance of said user to each presented training task of a training session is detected and memorized in a performance history of said user.

14. The training method according to claim 13, wherein the next training task of a training session is selected depending on the memorized performance history of said user.

15. The training method according to claim 12, wherein the scoring of the performance of said user is performed by giving credit points to said user in response to the detected performance of said user.

16. The training method according to claim 15, wherein the credit points are given depending on the detected performance of the user, user credit parameters and task credit parameters.

17. The training method according to claim 16, wherein the user credit parameters comprise the age of said user, a mental ability of said user and a gender of said user.

18. The training method according to claim 16, wherein the task credit parameters comprise a type of the presented training task, a difficulty level of said training task, and a performance history of said user for said training task.

19. The training method according to claim 12, wherein the content data item comprises a content identification, a content production date, and content data.

20. The training method according to claim 19, wherein the content data item further comprises a content type, content attributes, content rating attributes, and a content sequence identification.

21. The training method according to claim 12, wherein said training task comprises a training task identification, a training task type, training task attributes, training task rating attributes, and training task data.

22. The training method according to claim 21, wherein collectible content data items having the same content identification are collected by said user to assemble a complete content file.

23. The training method according to claim 22, wherein the assembled content file comprises the collected content data items in an order of the respective content sequence identifications of said content data items.

24. The training method according to claim 12, wherein the user age is input by said user or by a trainer or downloaded from a user database via a network.

25. The training method according to claim 12, wherein the user age is estimated from a performance and/or a content and task rating history of said user stored in a memory.

26. The training method according to claim 12, wherein the training task is formed by a memory training task.

27. The training method according to claim 12, wherein the training task is formed by an auditory training task, vision training task or by an attention training task.

28. The training method according to claim 12, wherein the training task comprises prompting to said user an aural stimulus or a visual stimulus.

29. A training method for training at least one user, comprising the following steps:
   (a) selecting rewards by a processor depending on a training date on which a training of said user is performed in a training session and depending on a birth date of said user; and
   (b) presenting said selected rewards depending on a performance of said user detected by said processor,
   wherein each selected reward has a production date which lies within a time range that is calculated as follows:

$$\text{production date} = \text{user birth date} + C_A \pm C_B,$$

wherein constant $C_A$, constant $C_B$ form adjustable time constraints.

30. The training method according to claim 29, wherein the birth date of said user and the constants $C_A$, $C_B$ are input by said user, a trainer or downloaded from a data base via a network.

31. A training method for motivating a user to perform a training task, said method comprising:
   (a) presenting to said user a training task via a user output interface;
   (b) recording a response by said user to said training task;
   (c) scoring a user's performance for said training task by a processor; and
   (d) on the basis of the scoring of step (c), playing or withholding from said user a content data item,
   wherein the content data item is selected depending on a training date on which the method is performed and depending on an age of said user,
   wherein the content data item comprises a content identification, a content production date, and content data, and
   wherein the production date lies within a time range which is calculated as:

$$\text{production date} = \text{training date} - \text{user age} + \text{constant}_A \pm \text{constant}_B.$$

32. The training method according to claim 31, further comprising on the basis of the scoring of step (c), increasing the length of the content data item.

33. The training method according to claim 31, further comprising:
   (i) repeating steps (a) to (d) to provide said user with several different collectable content data items; and
   (ii) combining two or more of collectable content data items from the same work prior to presenting the combined collectable content data items to said user.

34. A training method for improving a mental capacity of a user, said method comprising:
   (a) presenting to said user a training task via a user output interface;
   (b) recording a response of said user to said presented training task;
   (c) scoring a user's performance for said presented training task by a processor; and
   (d) on the basis of the scoring of step (c), playing or withholding from said user a content data item,
   wherein the content data item is selected depending on a training date on which the method is performed and depending on an age of said user,
   wherein the content data item comprises a content identification, a content production date, and content data, and
   wherein the production date lies within a time range which is calculated as:

$$\text{production date} = \text{training date} - \text{user age} + \text{constant}_A \pm \text{constant}_B.$$

* * * * *